G. W. F. HOOGEVEEN.

ELECTRIC CABLE AND CONDUCTOR.

No. 170,266. Patented Nov. 23, 1875.

WITNESSES:

INVENTOR:
G. W. F. Hoogeveen
BY
ATTORNEYS.

UNITED STATES PATENT OFFICE.

GEORGE W. F. HOOGEVEEN, OF HAARLEM, NETHERLANDS.

IMPROVEMENT IN ELECTRIC CABLES AND CONDUCTORS.

Specification forming part of Letters Patent No. 170,266, dated November 23, 1875; application filed December 12, 1874.

*To all whom it may concern:*

Figure 1:
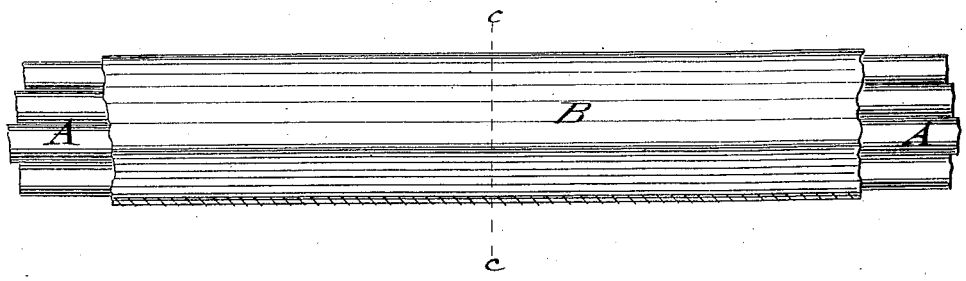
Figure 2:
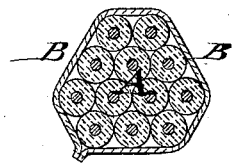

Be it known that I, GEORGE W. F. HOOGEVEEN, of Haarlem, in the Netherlands, have invented a new and Improved Underground Telegraph-Cable, of which the following is a specification:

In the accompanying drawing, Figure 1 represents a side view of a section of my improved underground telegraph cable or line; and Fig. 2, a vertical transverse section of the same on the line *c c*, Fig. 1.

Similar letters of reference indicate corresponding parts.

The object of my invention is to provide an improved system of underground telegraphic conductors, which, by simple and cheap means, avoids th influences of atmospheric electricity or moisture, and produces a perfect insulation without any metallic covering, while admitting the ready manufacture and transportation of the cable with any number of separate line-wires contained therein. My invention consists of a series of telegraph-wires, which are covered with gutta-percha, and sewed within a covering of sail-cloth made perfectly impervious to moisture and other disturbing agencies, by being impregnated and coated with highly-insulating material.

In the drawing, A represents a series of telegraph-wires, covered in the usual approved manner with gutta-percha, of which any required number is arranged within an outer inclosing-cover, B, of canvas or sail-cloth, that is made perfectly water-tight to be impervious to moisture and atmospheric influences, and forming also a completely insulating inclosure for the wires. The canvas covering B is, for this purpose, prepared by means of melted paraffine, to nine parts of which one part of glycerine is added, the mixture being applied warm by a brush to the canvas, which is then exposed to heat in a warm stove, or by passing it through warm rollers, so that the paraffine permeates equally and thoroughly the sail-cloth. A coating of india-rubber varnish, prepared by dissolving one part of india-rubber, cut into small pieces, in six parts of benzine, is then applied to the inside of the covering, and the same sewed around the wires, the seam being made water-tight by a thick coating of india-rubber varnish. The india-rubber varnish for the coating is made to flow easier by the addition of benzine, and is intended to form an insulating-layer between the paraffine compound and the gutta-percha covering of the wires, making the covering in connection with the paraffine insoluble to water and air, and highly insulating. The outer side of the canvas B is coated several times by a mixture of sulphur and coal-tar, preferably three parts of coal-tar with two parts of ground sulphur, being perfectly mixed and melted under gentle heat, and applied warm with brushes.

This compound resists the influences of water, air, and other distructive agencies in the ground, it is water-proof, and imparts unlimited duration to the covering, while adding to the insulating quality.

As no metal covering of any kind is used in the construction of the cable or line, and as the same is not liable to the influences of atmospheric and earth electricity, it being perfectly insulated, a safer and more reliable underground telegraphic conductor is thus furnished, which is superior to those heretofore employed, and by means of its ready manufacture and flexibility, easily shipped and laid in the ground.

It is advisable, however, to put on the last outer coating, especially where the line has been shipped to some distance, previous to the cable being placed into the ground.

Having thus described my invention, I claim as new and desire to secure by Letters Patent—

A flexible cable-cover, B, permeated with a mixture of paraffine and glycerine, provided on the outside with a coat of coal-tar and sulphur, and having on the inside a coat of rubber varnish and benzine, all as and for the purpose specified.

GEORGE W. F. HOOGEVEEN.

Witnesses:
BWEKENS,
*Not. Public.*
W. J. REŸNDERS.